United States Patent
Seok et al.

(10) Patent No.: US 10,667,237 B2
(45) Date of Patent: May 26, 2020

(54) ENHANCED TIMING MEASUREMENT TECHNIQUES FOR DETERMINING DISTANCE IN WIRELESS NETWORKS

(71) Applicant: MediaTek Singapore Pte. Ltd., Solaris (SG)

(72) Inventors: Yongho Seok, San Jose, CA (US); Chao-Chun Wang, San Jose, CA (US); Chih-Shi Yee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/119,048

(22) Filed: Aug. 31, 2018

(65) Prior Publication Data

US 2019/0069267 A1 Feb. 28, 2019

Related U.S. Application Data

(60) Provisional application No. 62/552,429, filed on Aug. 31, 2017.

(51) Int. Cl.
*H04W 64/00* (2009.01)
*H04W 24/10* (2009.01)
(Continued)

(52) U.S. Cl.
CPC ......... *H04W 64/003* (2013.01); *G01S 5/0284* (2013.01); *G01S 11/02* (2013.01);
(Continued)

(58) Field of Classification Search
CPC ...... G01S 5/0284; G01S 11/02; H04W 24/02; H04W 24/04; H04W 24/10; H04W 24/12; H04W 64/00; H04W 64/003; H04W 84/12
See application file for complete search history.

(56) References Cited

U.S. PATENT DOCUMENTS

| | | | |
|---|---|---|---|
| 2015/0036572 A1* | 2/2015 | Seok | H04W 52/0216 370/311 |
| 2015/0257028 A1* | 9/2015 | Chu | G01S 13/74 370/252 |

(Continued)

FOREIGN PATENT DOCUMENTS

| WO | 2014137391 A1 | 9/2014 |
|---|---|---|
| WO | 2015130712 A1 | 9/2015 |

OTHER PUBLICATIONS

Chittabrata Ghosh et al, Location Measurement Protocol for Unassociated STAs, Sep. 13, 2016, pp. 1-16, doc.: IEEE 802.11-16/1260r0, XP068107712;.

*Primary Examiner* — Candal Elpenord

(57) ABSTRACT

A method of determining a distance between mobile wireless devices can include determining a format and bandwidth supported by an initiating Station (STA) and a responding Station (STA) and exchanging one or more sets of Null Data Packet (NDP) frames between the initiating Station (STA) and the responding Station (STA) using the determined format and bandwidth. The distance between the initiating Station (STA) and the responding Station (STA) can then be determined based on timing measurements of the one or more sets of Null Data Packet (NDP) frames exchanged between the initiating Station (STA) and the responding Station (STA).

19 Claims, 10 Drawing Sheets

(51) Int. Cl.
*G01S 5/02* (2010.01)
*G01S 11/02* (2010.01)
*H04W 84/12* (2009.01)

(52) U.S. Cl.
CPC .......... *H04W 24/10* (2013.01); *H04W 64/00* (2013.01); *H04W 84/12* (2013.01)

(56) References Cited

U.S. PATENT DOCUMENTS

| | | | |
|---|---|---|---|
| 2015/0257120 A1* | 9/2015 | Prechner | H04W 64/003 455/456.1 |
| 2017/0013412 A1* | 1/2017 | Steiner | H04W 4/38 |
| 2017/0151449 A1* | 6/2017 | Ro | A61N 7/022 |
| 2017/0187830 A1* | 6/2017 | Eyal | H04L 67/327 |
| 2017/0251332 A1* | 8/2017 | Aldana | H04W 4/029 |
| 2017/0251449 A1* | 8/2017 | Malik | H04W 64/003 |
| 2017/0295004 A1* | 10/2017 | Amizur | H04L 5/0023 |
| 2018/0132278 A1* | 5/2018 | Oteri | H04W 74/02 |
| 2018/0310194 A1* | 10/2018 | Yang | H04W 64/00 |

\* cited by examiner

ENHANCED TIMING MEASUREMENT TECHNIQUES FOR DETERMINING DISTANCE IN WIRELESS NETWORKS

CROSS-REFERENCE TO RELATED APPLICATIONS

This application claims the benefit of U.S. Provisional Patent Application No. 62/552,429 filed Aug. 31, 2017, which is incorporated herein in its entirety.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing systems is the wireless networking of mobile devices. The Wireless networks can provide for determining the location of one or more devices in the network for use in applications such as advertising and marketing, stopping consumer from getting lost, tracking equipment, and the like.

Cellular telephone networks can utilize triangulation based on Global Position Satellite (GPS) signals, cell tower signals or a combination thereof to determine the location of user devices. However, GPS signals and cell tower signals can be relatively weak inside structures making the signals difficult to use to determine the location of a cellular and/or GPS enabled user device. Wi-Fi enabled devices can use beacon signals or timing measurement frames to determine the location of devices in the Wi-Fi network. The use of beacons however can be relatively expensive because multiple beacons are needed to cover a given area. The use of timing measurement frames in determining the position, location, distance, range measurement of the like of a Wi-Fi enable device to one or more other devices does not require the use of beacons. However, the current timing measurement frame based techniques can limit how accurately the position of a device can be determined and/or can be processing intensive. Accordingly, there is a continuing need for enhanced location determination techniques for use by mobile wireless network devices.

SUMMARY OF THE INVENTION

The present technology may best be understood by referring to the following description and accompanying drawings that are used to illustrate embodiments of the present technology directed toward techniques for determining a distance between devices based on timing measurements of one or more sets of Null Data Packet (NDP) frames exchanged between network devices.

In one aspect, a method of determining a distance between wireless devices can include transmitting a timing measurement request from an initiating Station (STA) to a responding Station (STA). The timing measurement request can include a request of a frame format and bandwidth supported by the initiating Station (STA). A timing measurement confirmation can be transmitted from the responding Station (STA) to the initiating Station (STA), wherein the timing measurement confirmation includes an indication of a frame format and bandwidth supported by the Requesting Station having a bandwidth that is no more than the requested frame format and bandwidth supported by the initiating Station (STA). One or more uplink Null Data Packet (NDP) frames can be transmitted from the initiating Station (STA) to the responding Station (STA) using the frame format and bandwidth supported by the Requesting Station. In addition, one or more downlink Null Data Packet (NDP) frames and one or more Location Measurement Report (LMR) frames can be transmitted, iteratively with the uplink Null Data Packet (NDP) frames, from the initiating Station (STA) to the responding Station (STA). The downlink Null Data Packet (NDP) frames and Location Measurement Reports (LMR) frames can also have the frame format and bandwidth supported by the Requesting Station. The Location Measurement Report (LMR) frames can include one or more timing measurements of the uplink and downlink Null Data Packet (NDP) determined by the responding Station (STA). The initiating Station (STA) can also determine one or more timing measurements of the uplink and downlink Null Data Packet (NDP) frames. The initiating Station (STA) can then determine a distance between the initiating Station (STA) and the responding Station (STA) based on the one or more timing measurements of the uplink and downlink Null Data Packet (NDP) frames received in the one or more Location Measurement Reports (LMR) and determined by the initiating Station (STA). The one or more timing measurement of the uplink and downlink Null Data Packet (NDP) frames can include the time-of-departure from the initiating Station (STA) of the one or more uplink Null Data Packet (NDP) frames, the time-of-arrival at the responding Station (STA) of the one or more uplink Null Data Packet (NDP) frames, the time-of-departure from the responding Station (STA) of the one or more downlink Null Data Packet (NDP) frames, and the time-of-arrival at the initiating Station (STA) of the one or more downlink Null Data Packet (NDP) frames.

In another aspect, a method of determining a distance between wireless devices can include transmitting a timing measurement request from an initiating Station (STA) to a responding Station (STA). The timing measurement request can include a request of a frame format and bandwidth supported by the initiating Station (STA). A timing measurement confirmation can be transmitted from the responding Station (STA) to the initiating Station (STA), wherein the timing measurement confirmation includes an indication of a frame format and bandwidth supported by the Requesting Station having a bandwidth that is no more than the requested frame format and bandwidth supported by the initiating Station (STA). A group of timing measurement triggers can be sent form the responding Station (STA) to a set of initiating Stations (STA) using the frame format and bandwidth supported by the Requesting Station. One or more of a set of uplink Null Data Packet (NDP) frames can be transmitted from the set of initiating Stations (STA) to the responding Station (STA) using the frame format and bandwidth supported by the Requesting Station. Multiple sets of frames including groups of triggers and multiple set of uplink Null Data Packet (NDP) frames can be exchanged between the responding Station (STA) and the initiating Stations (STA) to support a large number of initiating Stations (STA). One or more downlink Null Data Packet (NDP) frames and one or more. Location Measurement Report (LMR) frames can be transmitted from the responding Station (STA) to the initiating Station (STA) using the frame format and bandwidth supported by the Requesting Station. The Location Measurement Report (LMR) frames can include one or more timing measurements of the uplink and downlink Null Data Packet (NDP) determined by the responding Station (STA). The initiating Station (STA) can also determine one or more timing measurements of the uplink and downlink Null Data Packet (NDP) frames. The initiating Station (STA) can again determine a distance between the initiating Station (STA) and the responding Station (STA) based on the one or more timing measurements of the uplink and downlink Null Data Packet (NDP) frames received in the one or more Location Measurement Reports (LMR) and determined by the initiating Station (STA).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
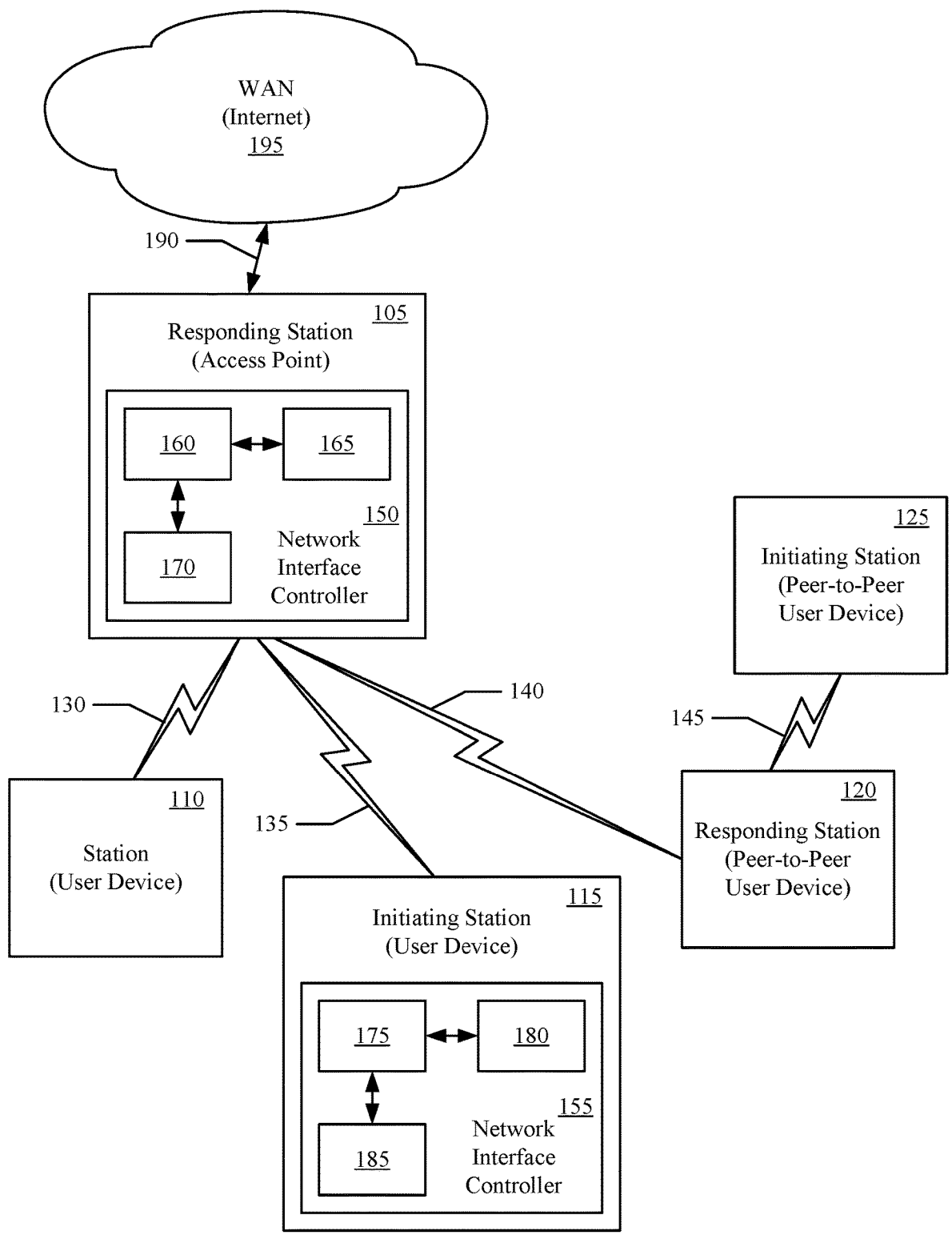
FIG. 1 shows a communication system, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block, and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, a communication system, in accordance with aspects of the present technology is shown. The communication system can include a plurality of stations (STA) 105-125 communicatively coupled together by one or more wireless communication links 130-145 in a Wireless Local Area Network (WLAN). The stations 105-130 can include a computing device in combination with a wireless network interface controller 150, 155. The computing devices can be any type of computing device; including but not limited to desktop Personal Computers (PCs), laptop PCs, tablet PCs, printers, smart phones, smart televisions, game consoles, infotainment systems, Internet of Thing (IOT) devices and the like. The network interface controller 150 can include one or more processors 160, one or more memories 165, and one or more transceivers 170. The memory 165 can store one or more computing device executable instructions and data that when processed by the one or processors 160 implement one or more functions performed by the stations 105-125 as described herein. The wireless communication links 130-145 can be compliant with a specified wireless protocol standard. In one implementation, the wireless communication links 130-145 can be compliant with the Institute of Electrical and Electronics Engineering (IEEE) 802.11 standard, commonly referred to as Wi-Fi communication links 130-145.

One or more stations 105 can also be communicatively coupled 175 to one or more Wide Area Networks (WANs) 195 or the like. Stations 105 communicatively coupled to one or more WANs 195 by a wired communication link 190 can also be referred to as Access Points (AP). An Access Point can connect a group of stations to a Wired network 195. The Access Point can be a standalone device or be integral with a computing device such as desktop PCs, laptop PCs, tablet PCs, smart phones, routers, modems and the like. In addition, stations can be communicatively coupled in a Peer-to-Peer A number of the stations can be mobile computing devices, such as laptop PCs, tablet PCs, smart phones, infotainment systems, and IOT devices. In aspects, the communication system can implement location services based upon the determination of the distance between stations. The location of stations, to within ten or less meters, can be determined as a function the time that it takes for the wireless signal in travel from one station to another station. In an Access Point implementation, a Station can determine the distance between the Station and an Access Point (e.g., a Single User (SU) implementation) as a function the time that it takes for wireless signals to travel between the Station and the Access Point, or between a plurality of Stations and an Access Point (e.g., a Multi-User (MU) implementation). In a Peer-to-Peer implementation, a Station can determine the distance between the Station and another Station (e.g., a Single User (SU) implementation) as a function the time that it takes for wireless signals to travel between the Station and the other Station.

Figure 2A:
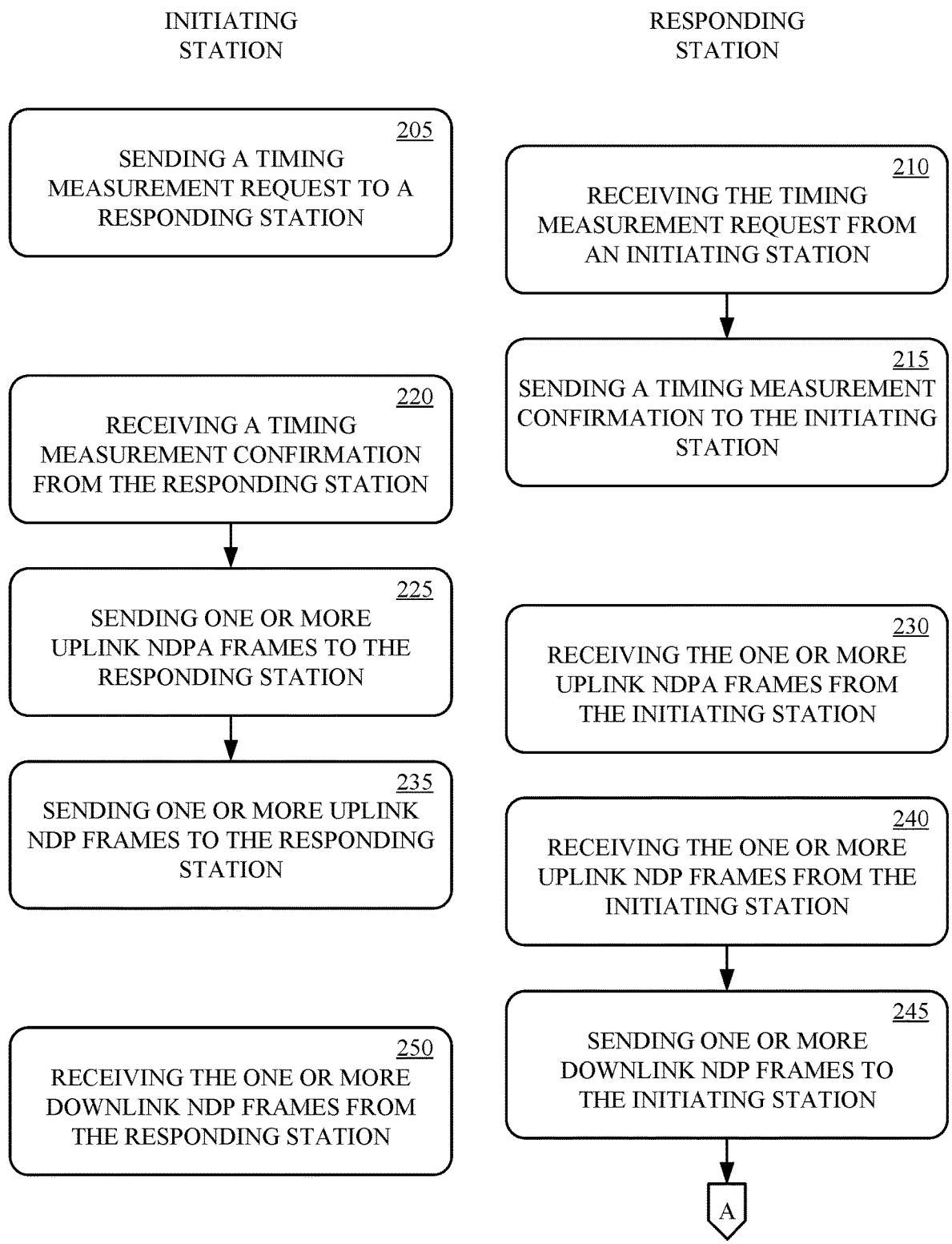
FIGS. 2A, 2B and 2C show a method of determining a distance between wireless devices, in accordance with aspects of the present technology.
Figure 2B:
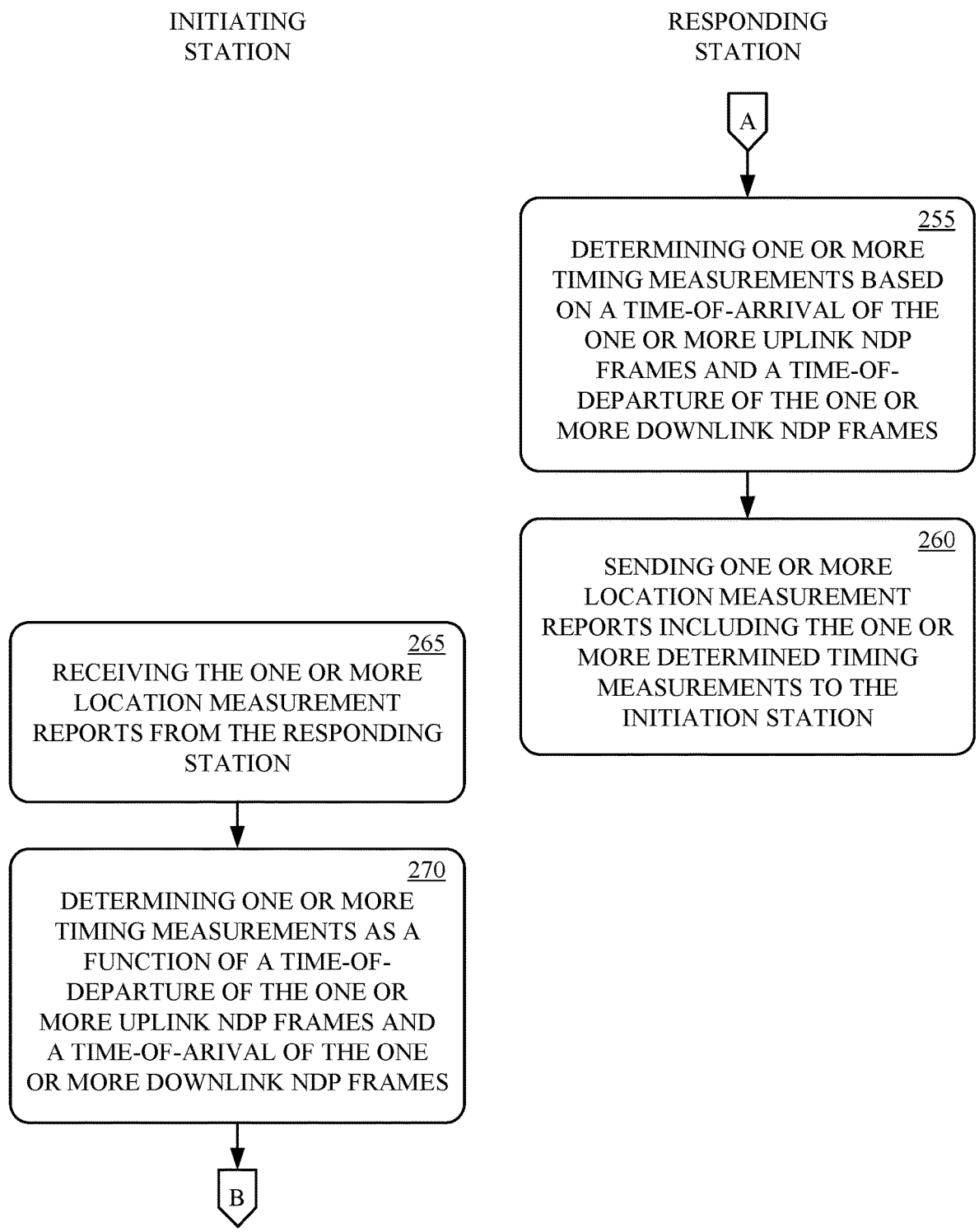
Figure 2C:
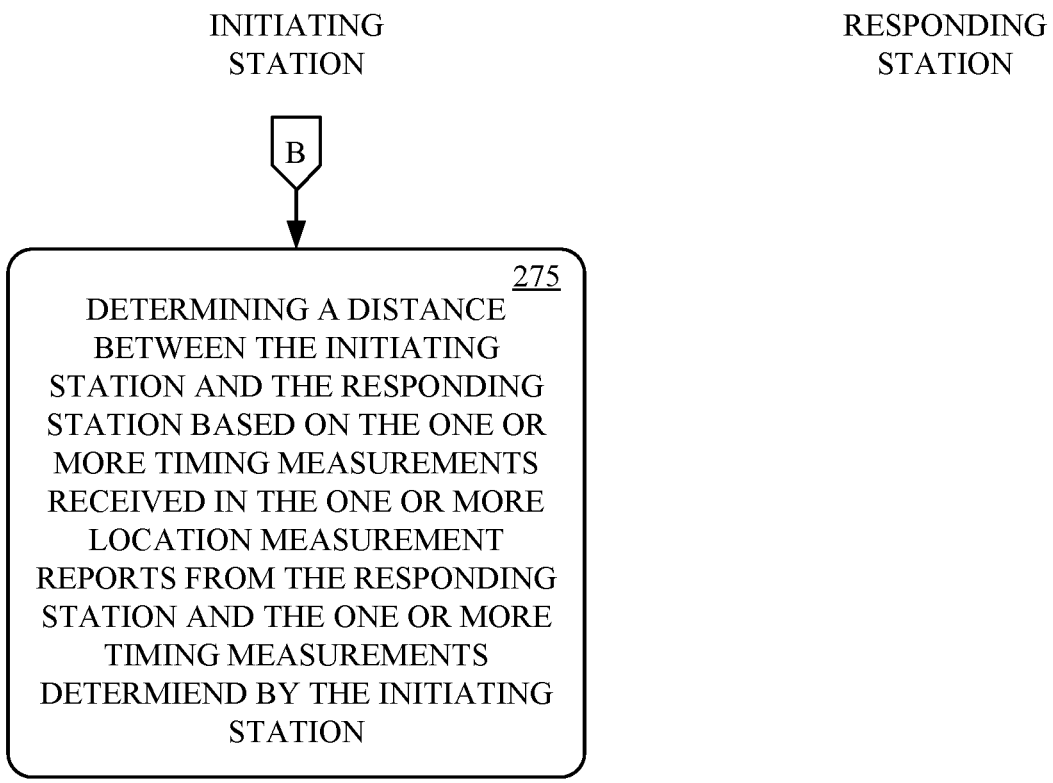

Referring now to FIGS. 2A-2C, a method of determining a distance between wireless devices, in accordance with aspects of the present technology is shown. The method of determining the distance between wireless devices can be implemented as computing device-executable instructions (e.g., computer program) that are stored in the one or more memories 165, 180 (e.g., computing device-readable media) and executed by the one or more processors 160, 175 to control the one or more transceivers 170, 185 in the network interface controller 150, 155 of corresponding stations 105, 115, 120, 125 in accordance with aspects of the present technology.

The method can include an initiating Station (STA) sending a timing measurement request to a responding Station (STA), at 205. At 210, the responding station can receive the timing measurement request from the initiating Station (STA). In an Access Point implementation, the initiating Station (STA) can be a mobile client device and the responding Station (STA) can be an Access Point that sends and receives frames using a Wi-Fi communication protocol. In a Peer-to-Peer implementation, the initiating Station (STA) can be a first Peer-to-Peer client device and the responding Station (STA) can be a second Peer-to-Peer client device. At 215, the responding station can send a timing measurement confirmation to the initiating Station (STA). At 220, the initiating Station (STA) can receive the timing measurement confirmation from the responding Station (STA). In one implementation, the timing measurement request can include a Wi-Fi initiating Fine Timing Measurement (iFTM) request frame and the timing measurement confirmation can include an initiating Fine Timing Measurement (iFTM) frame.

The initiating Station (STA) can optionally send one or more uplink Null Data Packet Announcement (NDPA) frames to the responding Station (STA) after receiving the timing measurement confirmation, at 225. At 230, the responding Station (STA) can receive the optional one or more uplink Null Data Packet Announcement (NDPA) frames from the initiating Station (STA).

After sending the timing measurement confirmation and each of the one or more optional uplink Null Data Packet Announcement (NDPA) frames, the initiating Station (STA) can send one or more uplink Null Data Packet (NDP) frames to the responding Station (STA), at 235. At 240, the responding Station (STA) can receive the one or more uplink Null Data Packet (NDP) frames from the initiating Station (STA). In response to receipt of the uplink Null Data Packet (NDP) frames, the responding Station (STA) can send one or more downlink Null Data Packet (NDP) frames to the initiating Station (STA), at 245. At 250, the initiating Station (STA) can receive the one or more downlink Null Data Packet (NDP) frames from the responding Station (STA).

At 255, the responding Station (STA) can determine one or more timing measurements of the one or more uplink and downlink Null Data Packet (NDP) frames. In one implementation, the timing measurements determined by the responding Station (STA) can include the time-of-arrival of the one or more uplink Null Data Packet (NDP) frames and the time-of-departure of the one or more downlink Null Data Packet (NDP) frames. At 260, the responding Station (STA) can send one or more Location Measurement Report (LMR) frames including the one or more timing measurements determined by the responding Station (STA). At 265, the initiating Station (STA) can receive the one or more Location Measurement Report (LMR) frames from the initiating Station (STA).

Figure 3:
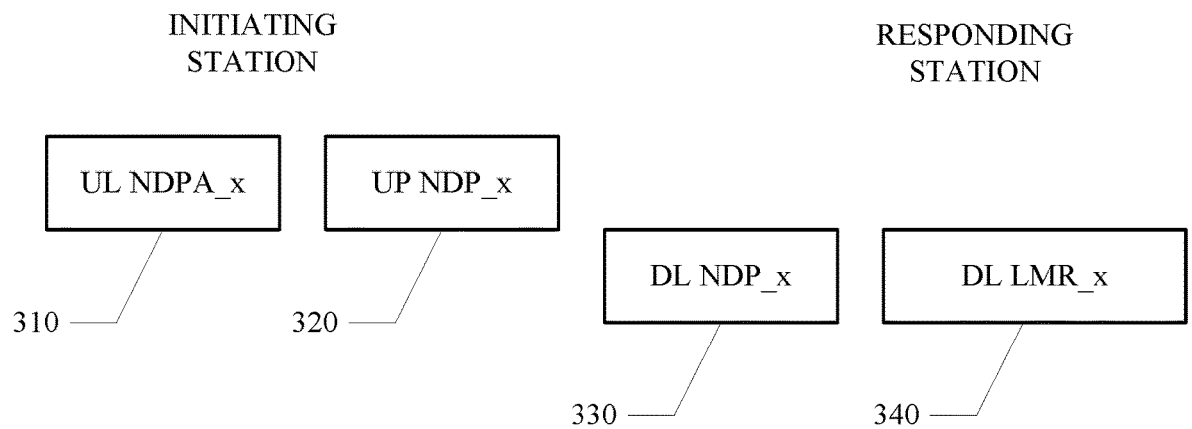
FIG. 3 illustrates an exemplary exchange of a set of an uplink Null Data Packet Announcement (NDPA) frame, an uplink Null Data Packet (NDP) frame, a downlink Null Data Packet (NDP) frame, and a Location Measurement Report (LMR) frame.

Referring now to FIG. 3 an exemplary exchange of a set of an uplink Null Data Packet Announcement (NDPA) frame 310, an uplink Null Data Packet (NDP) frame 320, a downlink Null Data Packet (NDP) frame 330, and a Location Measurement Report (LMR) frame 340 is illustrated. The one or more optional uplink Null Data Packet Announcement (NDPA) frames, the one or more uplink Null Data Packet (NDP) frames, the one or more downlink Null Data Packet (NDP) frames, and the one or more Location Measurement Report (LMR) frames can be iteratively sent between the initiating and responding Stations (STA). The one or more optional uplink. Null Data Packet Announcement (NDPA) frames, the one or more uplink Null Data Packet (NDP) frames, the one or more downlink Null Data Packet (NDP) frames and the one or more Location Measurement Report (LMR) frames exchanged between the initiating and responding Stations (STA) can be transmitted based on a format and bandwidth indicated in the timing measurement request or optionally the timing measurement confirmation exchanged between the initiating Station (STA) and the responding Station (STA).

In one implementation, the responding Station (STA) should transmit the initiating Fine Timing Measurement (iFTM) frame with the format and bandwidth that it indicated. The responding Station (STA) can use a 242-tone or less Resource Unit (RU), a 484-tone or less Resource Unit (RU), 996-tone or less Resource Unit (RU), or 2×996-tone or less Resource Unit (RU) when the bandwidth that the responding Station (STA) indicated is 20 MHz, 40 MHz, 80 MHz or 160 MHz; respectively. The responding Station (STA) can assign a 242-tone or less Resource Unit (RU), 484-tone or less Resource Unit (RU), 996-tone or less Resource Unit; or 2×996-tone or less Resource Unit (RU) for soliciting a High Efficiency (HE) Multi-User (MU) Physical Layer Convergence Procedure Protocol Data Unit (PPDU) carrying the Acknowledgment (Ack) of the initiating Fine Timing Measurement (iFTM) frame received by the initiating Station (STA) when the bandwidth that the responding Station (STA) indicated is 20 MHz, 40 MHz, 80 MHz, or 160 MHz, respectively. The bandwidth of the Resource Unit (RU) carry the Acknowledgement (Ack) response of the initiating Fine Timing Measurement (iFTM) frame in the High Efficiency (HE) Trigger-Based (TB) Physical Layer Convergence Procedure Protocol Data Unit (PPDU) should be the same as the bandwidth of the Resource Unit (RU) carrying the High Efficiency (HE) Multi-User (MU) Physical Layer Convergence Procedure Protocol Data Unit (PPDU).

In one implementation, the responding Station (STA) can also transmit initiating Fine Timing Measurement (iFTM) frame in a High Efficiency (HE) Multi-User (MU) Physical Layer Convergence Procedure Protocol Data Unit (PPDU) using a 26-tone Resource Unit (RU), 52-tone Resource Unit (RU), or 106-tone Resource Unit (RU). However, if the initiating Station (STA) does not want to receive the initiating Fine Timing Measurement (iFTM) frame on such a small Resource Unit (e.g., less than 20 MHz), the initiating Station (STA) can include a minimum bandwidth information field in the parameter element of the initiating Fine Timing Measurement (iFTM) request frame. In an exemplar implementation, the minimum bandwidth information field can be set to 0, 1, 2 or 3 to indicating a 26-tone or less Resource Unit (RU), 52-tone or less Resource Unit (RU), 106-tone or less Resource Unit (RU) or 242-tone or less Resource Unit (RU), respectively. In such case, the responding Station (STA) should not transmit initiating Fine Timing Measurement (iFTM) frames with a bandwidth which is less than the bandwidth that the responding Station (STA) indicated in the minimum bandwidth information field. The responding Station (STA) also should not solicit a High Efficiency (HE) Trigger-Based (TB) Physical Layer Convergence Procedure Protocol Data Unit (PPDU) carry the Acknowledgment (Ack) of the received initiating Fine Timing Measurement (iFTM) frame on the Resource Unit (RU) of which the bandwidth is less than the bandwidth that the responding Station (STA) indicated by the minimum bandwidth information field.

Referring again to FIG. 2B, the initiating Station (STA) can determine one or more timing measurements of the one or more uplink and downlink Null Data Packet (NDP) frames, at 270. In one implementation, the timing measurements determined by the initiating Station (STA) can include the time-of departure of the one or more uplink Null Data Packet (NDP) frames and the time-of arrival of the one or more downlink Null Data Packet (NDP) frames. At 275, the initiating Station (STA) can determine a distance between the initiating Station (STA) and the responding Station (STA) based on the one or more timing measurements of the uplink and downlink Null Data Packet (NDP) frames received in the one or more Location Measurement Reports (LMR) and the one or more timing measurements of the uplink and downlink Null Data Packet (NDP) frames determined by the initiating Station (STA). The initiating Station (STA) can also determine the location of the initiating Station (STA) further based on the shared location of the responding Station (STA) (e.g., latitude and longitude of the Access Point responding Station (STA)), shared height of the responding Station (STA) (e.g., floor number and/or height above the floor), shared neighbor report, Uniform Resource Identifier (URI) or Domain Name in combination with a network mapping, and/or the like.

Figure 4A:
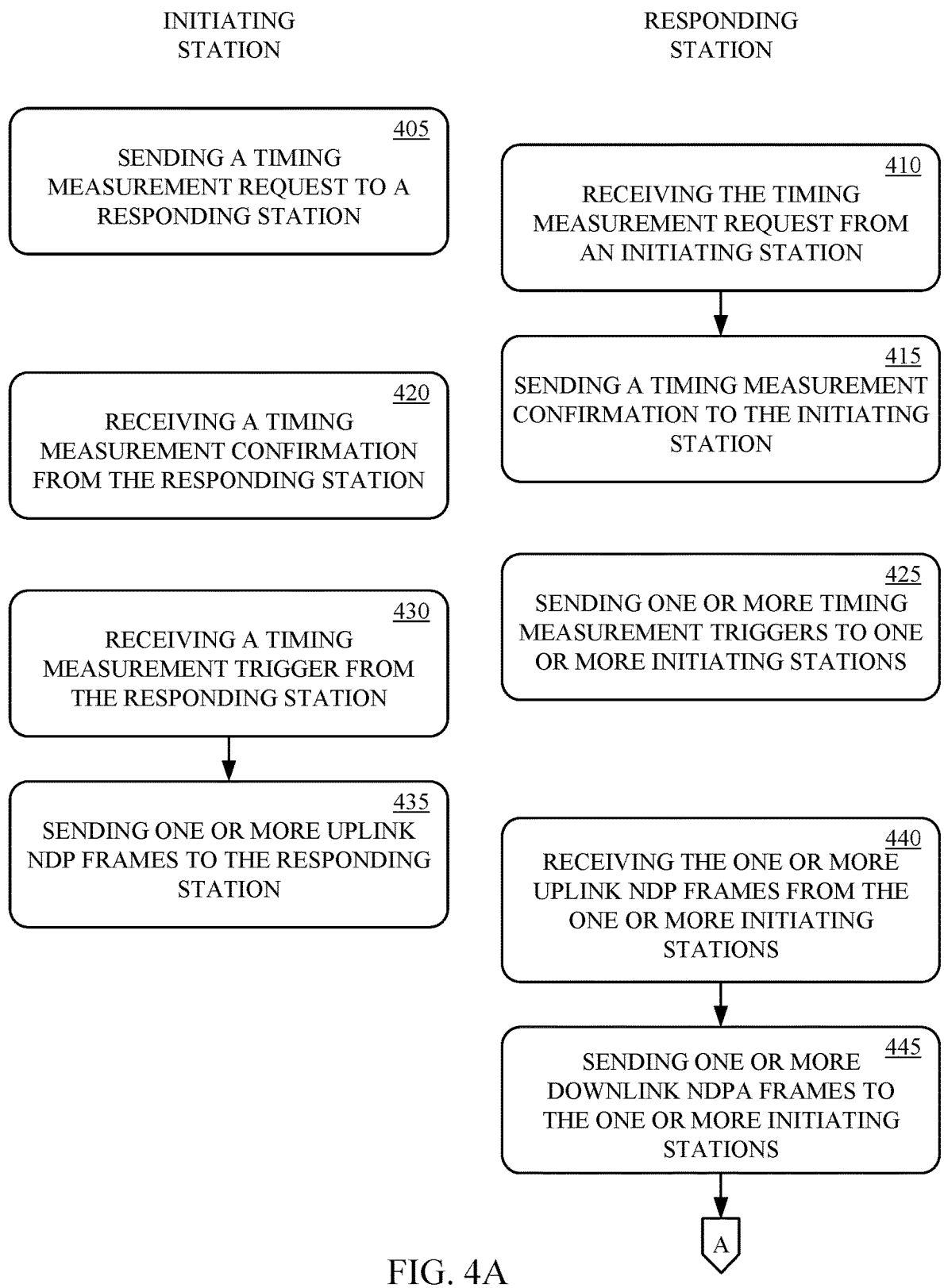
FIGS. 4A, 4B and 4C show a method of determining a distance between wireless devices, in accordance with aspects of the present technology.
Figure 4B:
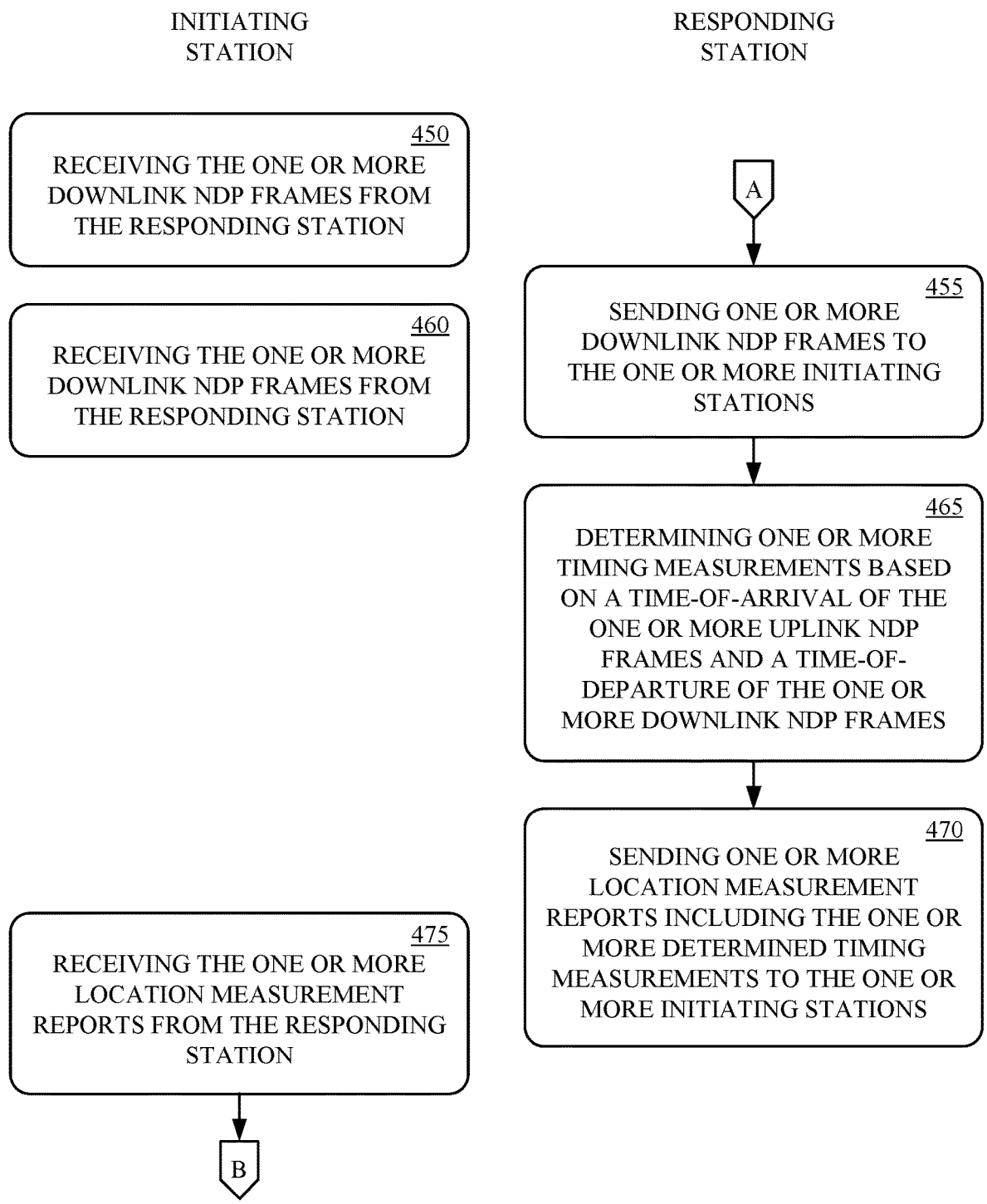
Figure 4C:
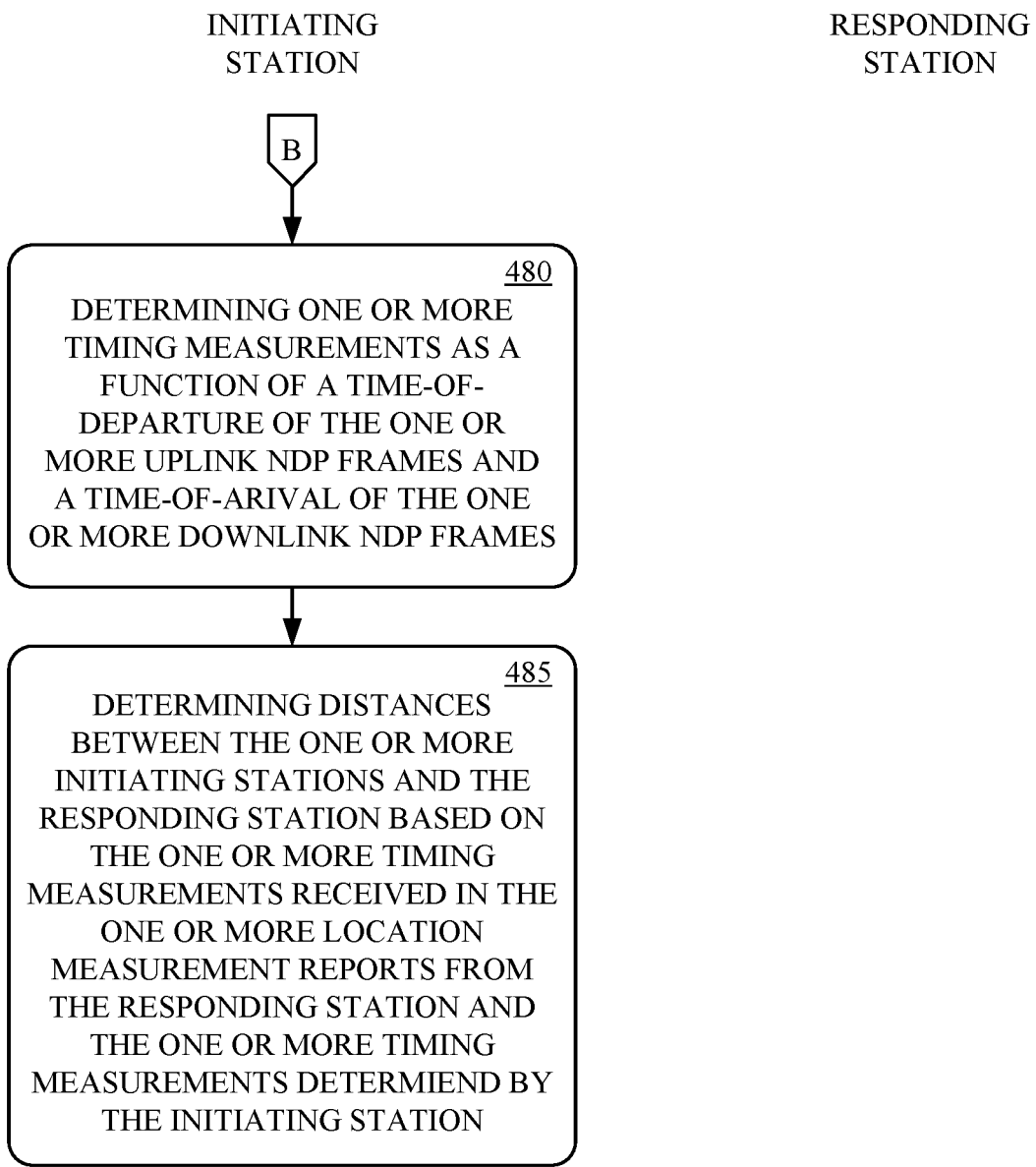

Referring now to FIGS. 4A-4C, a method of determining a distance between wireless devices, in accordance with aspects of the present technology is shown. The method of determining the distance between wireless devices can again be implemented as computing device-executable instructions (e.g., computer program) that are stored in the one or more memories 165, 180 (e.g., computing device-readable media) and executed by the one or more processors 160, 175 to control the one or more transceivers 170, 185 in the network interface controller 150, 155 of corresponding stations 105, 115, 120, 125 in accordance with aspects of the present technology.

The method can include an initiating Station (STA) sending a timing measurement request to a responding Station (STA), at 405. At 410, the responding station can receive the timing measurement request from the initiating Station (STA). At 415, the responding station can send a timing measurement confirmation to the initiating Station (STA). At 420, the initiating Station (STA) can receive the timing measurement confirmation from the responding Station (STA). In one implementation, the timing measurement request can include a Wi-Fi initiating Fine Timing Measurement (iFTM) request frame and the timing measurement confirmation can include an initiating Fine Timing Measurement (iFTM) frame.

The responding Station (STA) can send one or more groups of timing measurement triggers one or more times to one or more initiating Stations (STA) after sending the timing measurement confirmation, at 425. At 430, the one or more initiating Stations (STA) can receive a timing measurement trigger from the responding Station (STA).

The initiating Stations (STA) can send corresponding uplink Null Data Packet (NDP) frames one or more times to the responding Station (STA), at 435. The responding Station (STA) can receive the uplink Null Data Packet (NDP) frames one or more times from the initiating Stations (STA), at 440.

The responding Station (STA) can send one or more downlink Null Data Packet Announcement (NDPA) frames to the one or more initiating Stations (STA) after receiving the uplink Null Data Packet (NDP) frames one or more times to the one or more initiating Stations (STA), at 445. The one or more initiating Stations (STA) can receive the uplink Null Data Packet Announcement (NDPA) frames one or more times from the responding Stations (STA), at 450.

The responding Station (STA) can send one or more downlink Null Data Packet (NDP) frames to the one or more initiating Stations (STA) after sending the downlink Null Data Packet Announcement (NDPA) frames, at 455. The initiating Station (STA) can receive the downlink Null Data Packet (NDP) frame from the responding Station (STA), at 460.

At 465, the responding Station (STA) can determine one or more timing measurements of the one or more uplink and downlink Null Data Packet (NDP) frames. In one implementation, the timing measurements determined by the responding Station (STA) can include the time-of-arrival of the one or more uplink Null Data Packet (NDP) frames and the time-of-departure of the one or more downlink Null Data Packet (NDP) frames. At 470, the responding Station (STA) can send one or more Location Measurement Report (LMR) frames including the one or more timing measurements to the one or more initiating Stations (STA). At 475, the one or more initiating Stations (STA) can receive the one or more Location Measurement Report (LMR) frames from the responding Station (STA).

Figure 5:
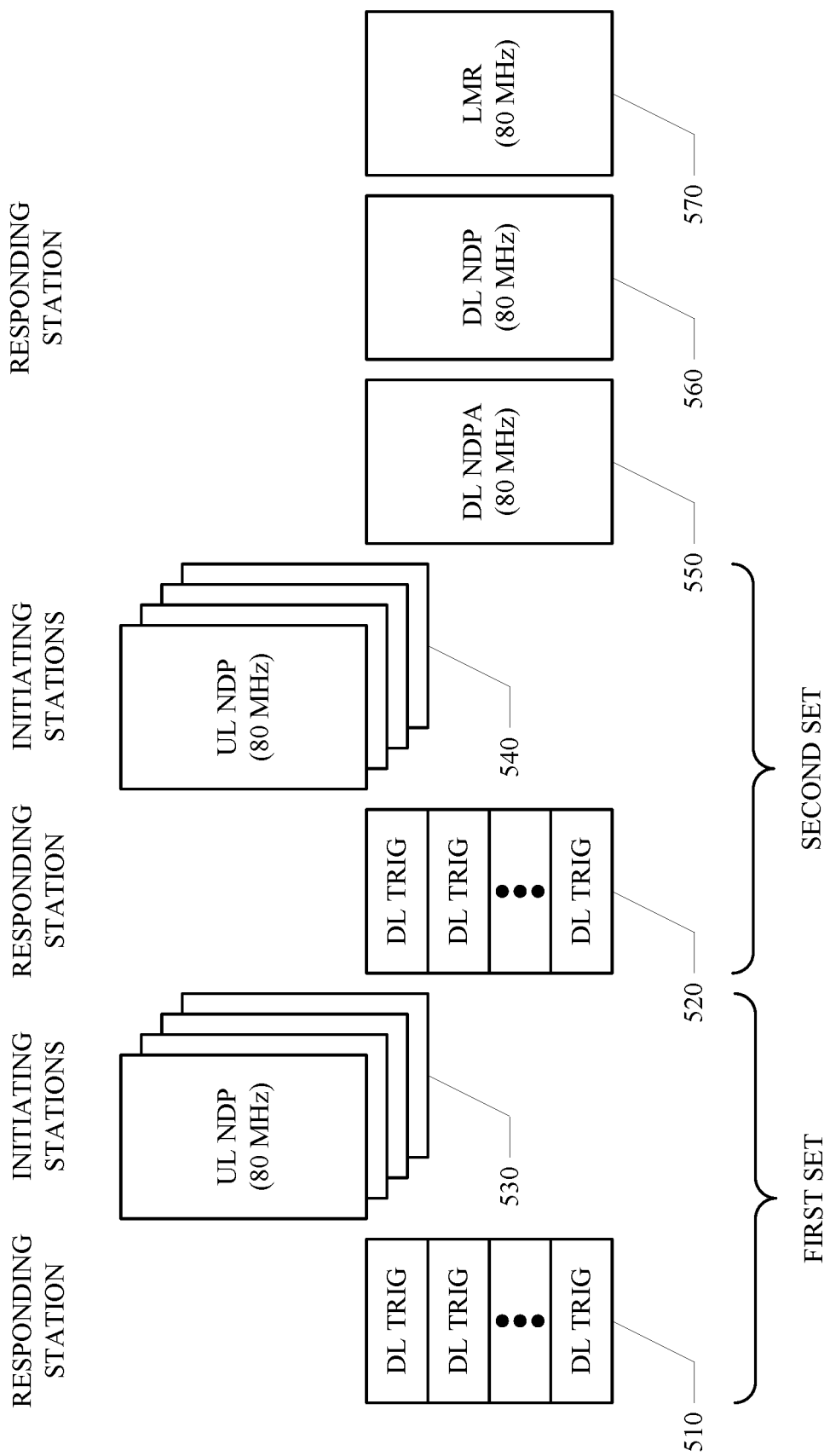
FIG. 5 illustrates an exemplary exchange of one or more sets of groups of timing measurement triggers, groups uplink Null Data Packet Announcement (NDPA) frames and an uplink Null Data Packet (NDP) frames, a downlink Null Data Packet Announcement (NDPA) frame, a downlink Null-Data Packet (NDP) frame, and a Location Measurement Report (LMR) frame.

Referring now to FIG. 5 an exemplary exchange of one or more sets of groups of timing measurement triggers 510, 520, one or more sets of groups of uplink Null Data Packet (NDP) frames 530, 540, a downlink Null Data Packet Announcement (NDPA) frame 550, a downlink Null Data Packet (NDP) frame 560, and a Location Measurement Report (LMR) frame 570 is illustrated. Timing measurement triggers for a group of initiating Stations (STA) can be sent together in a frame. If there is a large number of initiating Stations (STA), groups of timing measurement triggers can be sent in a plurality of frames. Corresponding initiating Stations (STA) can send uplink Null Data Packet (NDP) frames to the responding Station (STA) in corresponding sets. The groups of timing measurement triggers, groups of uplink Null Data Packet (NDP) frames, the downlink Null Data Packet Announcement (NDPA) frames, the downlink Null Data Packet (NDP) frames, and the Location Measurement Report (LMR) frames can be iteratively sent between the initiating and responding Stations (STA). The groups of timing measurement triggers, groups of uplink Null Data Packet (NDP) frames, the downlink Null Data Packet Announcement (NDPA) frames, the downlink Null Data Packet (NDP) frames, and the Location Measurement Report (LMR) frames exchanged between the initiating and responding Stations (STA) can be transmitted based on a format and bandwidth indicated in the timing measurement request or optionally the timing measurement confirmation exchanged between the initiating Station (STA) and the responding Station (STA).

In one implementation, when the responding Station (STA) transmits a trigger frame (e.g., High Efficiency HEz trigger frame), the responding Station (STA) shall not use a bandwidth wider than that indicated in the initiating Fine Timing Measurement (iFTM) request frame. In such case, the responding Station (STA) shall set the transmit vector (TXVECTOR) parameter of the channel bandwidth (CH BANDWIDTH) to the same value as the bandwidth (BW) subfield of the common info field in the trigger frame. When the responding Station (STA) transmits the Null Data Packet Announcement (NDPA) frames and the downlink Null Data Packet (NDP) frames, after receiving uplink Null Data Packet (NDP) frames from the initiating Station (STA), the responding Station (STA) shall set the transmit vector (TXVECTOR) parameter of the channel bandwidth (CH BANDWIDTH) to the same value as the bandwidth of the trigger and the uplink Null Data Packet (NDP) frames transmitted in a preceding uplink sounding phase. The bandwidth (BW) field of the SIG-A field in an uplink Null Data Packet (NDP) frame represents the bandwidth of the uplink Null Data Packet (NDP) frame. The bandwidth (BW) field of the SIG-A field in an uplink Null Data Packet (NDP) frame is set to a same bandwidth value indicated in bandwidth (BW) subfield of the common info field in the trigger frame. When the initiating Station (STA) transmits uplink Null Data Packet (NDP) frames, as a response to the trigger frame, the initiating Station (STA) shall set the transmit vector (TXVECTOR) parameter of the channel bandwidth (CH BANDWIDTH) to the same value as the bandwidth (BW) subfield of the common info field in the trigger frame.

In one implementation, when the responding Station (STA) is transmitting a trigger frame, the responding Station (STA) can assign a 242-tone or less Resource Unit (RU), a 484-tone or less Resource Unit (RU), a 996-tone or less Resource Unit (RU), or 2×996-tone or less Resource Unit (RU) for soliciting a High Efficiency (HE) Trigger-Based (TB) Physical Layer Convergence Procedure Protocol Data Unit (PPDU) carrying an uplink Null Dam Packet (NDP) when the bandwidth that the responding Station (STA) indicated is 20 MHz, 40 MHz, 80 MHz, or 160 MHz, respectively. When the responding Station (STA) is transmitting a downlink Null Data Packet Announcement (NDPA) frame and a downlink Null Data Packet (NDP) frame, the responding Station (STA) can set the bandwidth of the downlink Null Data Packet Announcement (NDPA) frame and a downlink Null Data Packet (NDP) frame to the same value as the bandwidth of the downlink trigger frame and the uplink Null Data Packet (NDP) transmitted in a proceeding sounding phase. In one implementation, the bandwidth field of the SIG-A field in an uplink Null Data Packet (NDP) frame represent the bandwidth of the uplink Null Data Packet (NDP) frame. The responding Station should transmit the downlink Null Data Packet Announcement (NDPA) frame and a downlink Null Data Packet (NDP) frame with the bandwidth that it indicated.

In one implementation, if the initiating Station (STA) does not want to transmit an uplink Null Data Packet (NDP) on a small Resource Unit (RU) (e.g., less than 20 MHz), the initiating Station (STA) can include a minimum bandwidth information field in the parameters element of a initiating Fine Timing Measurement (iFTM) request frame. In an exemplary implementation, the minimum bandwidth information field can be set to a value of 0, 1, 2 or 3 for indicating a 26-tone or less Resource Unit (RU), 52-tone or less Resource Unit (RU), 106-tone or less Resource Unit (RU), or 242-tone or less Resource Unit (RU), respectively. The responding Station (STA) should not solicit a High Efficiency (HE) Trigger-Based (TB) Physical Layer Convergence Procedure Protocol Data Unit (PPDU) carrying an uplink Null Data Packet (NDP) on the Resource Unit (RU) of which the bandwidth is less than what the responding Station (STA) indicated in the minimum bandwidth information field.

Referring again to FIG. 4C, the initiating Station (STA) can determine one or more timing measurements of the one or more uplink and downlink Null Data Packet (NDP) frames, at 480. In one implementation, the timing measurements determined by the initiating Station (STA) can include the time-of departure of the one or more uplink Null Data Packet (NDP) frames and the time-of-arrival of the one or more downlink Null Data Packet (NDP) frames. At 485, the initiating Station (STA) can determine a distance between the initiating Station (STA) and the responding Station (STA) based on the one or more timing measurement in the one or more Location Measurement Report (LMR) frames and the one or more timing measurements determined by the initiating Station (STA). The initiating Station (STA) can also determine the location of the initiating Station (STA) further based on the shared location of the responding Station (STA) (e.g., latitude and longitude of the Access Point responding Station (STA)), shared height of the responding Station (STA) (e.g., floor number and/or height above the floor), shared neighbor report, Uniform Resource Identifier (URI) or Domain Name in combination with a network mapping, and/or the like.

Figure 6:
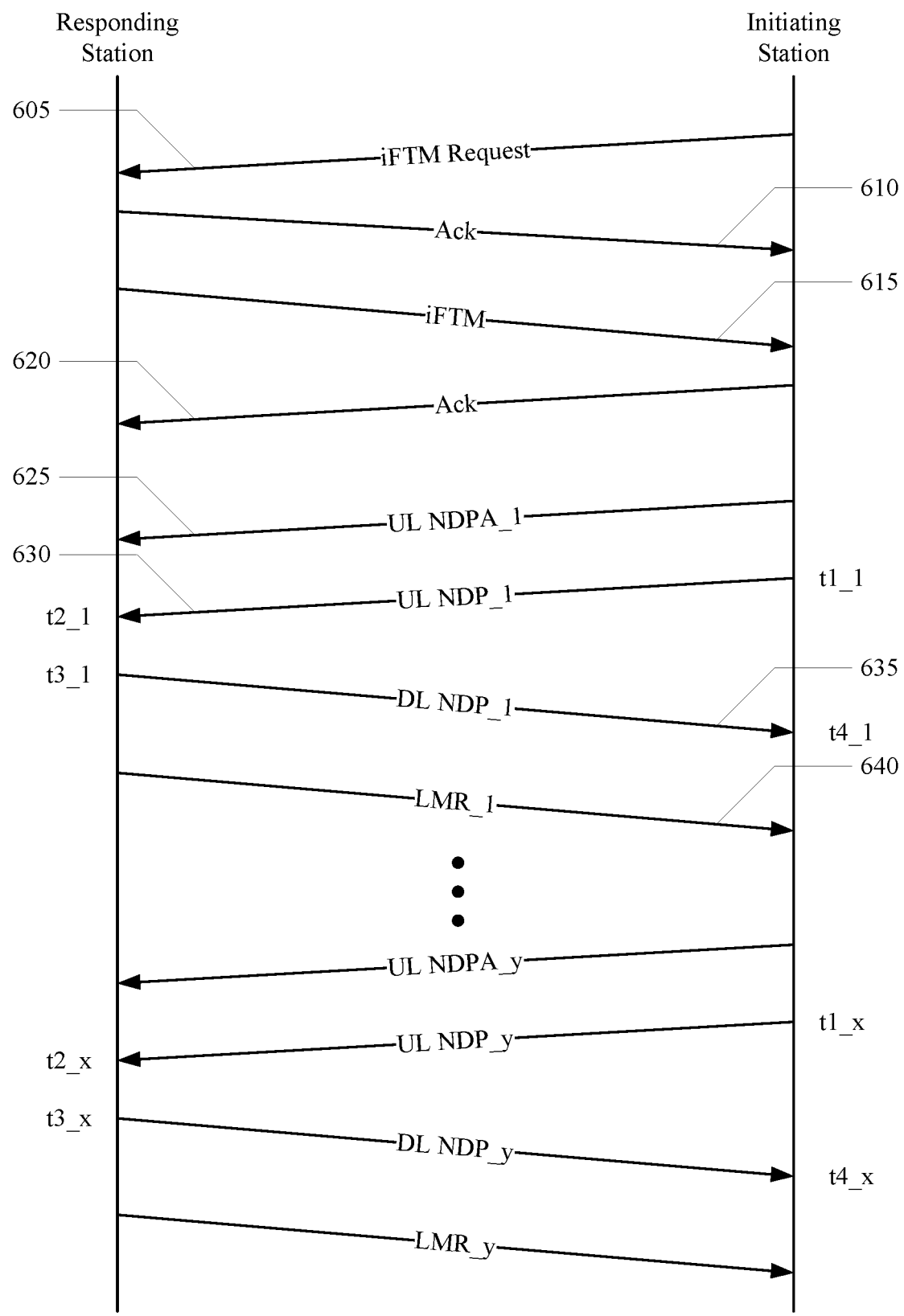
FIG. 6 shows an Enhanced Fine Timing Measurement (EFTM) Wi-Fi method, in accordance with aspects of the present technology.

Referring now to FIG. 6, an Enhanced Fine Timing Measurement (EFTM) Wi-Fi method, in accordance with aspects of the present technology is shown. The Enhanced Fine Timing Measurement (EFTM) Wi-Fi method can be implemented as computing device-executable instructions (e.g., computer program) that are stored in the one or more memories 165, 180 (e.g., computing device-readable media) and executed by the one or more processors 160, 175 to control the one or more transceivers 170, 185 in the network interface controller 150, 155 of corresponding stations 105, 115, 120, 125 in accordance with aspects of the present technology. The Enhanced Fine Timing Measurement (EFTM) can be based on Null Data Packet Announcement (NDPA) and Null Data Packet (NDP) frames of the Wi-Fi protocol.

The Enhanced Fine Timing Measurement (EFTM) can be initiated by a first Station, referred to as an initiating Station (STA), sending an initiating Fine Timing Measurement (iFTM) request frame to a second Station, referred to as a responding Station (STA), at 605. In an access point implementation, the initiating Station (STA) can be a user device 115 and the responding Station (STA) can be air Access Point 105, as illustrated in FIG. 1. In a peer-to-peer implementation, the initiating Station (STA) can be a first user device 125 and the responding Station (STA) can be a second user device 120, as illustrated in FIG. 1. The initiating Fine Timing Measurement (iFTM) request frame can include one or more measurement parameters including a format and bandwidth field. The initiating Station (STA) can indicate a requested format and bandwidth that it supports in the measurement parameters of the initiating Fine Timing Measurement (iFTM) request frame. In one implementation, the exemplary format and bandwidth field values in Table 1 can specify various formats and bandwidths.

TABLE 1

| Field Value | Format | Bandwidth (MHz) |
|---|---|---|
| 0 | No Preference | No Preference |
| 1-3 | Reserved | Reserved |
| 4 | Non-HT | 5 |
| 5 | Reserved | Reserved |
| 6 | Non-HT | 10 |
| 7 | Reserved | Reserved |
| 8 | Non-HT Excluding Clause 15 and 16 | 20 |
| 9 | HT Mixed | 20 |
| 10 | VHT | 20 |
| 11 | HT Mixed | 40 |
| 12 | VHT | 40 |
| 13 | VHT | 80 |
| 14 | VHT | 80 + 80 |
| 15 | VHT (Two Separate RF LOs) | 160 |
| 16 | VHT (Single RF LO) | 160 |
| 17 | HE SU | 20 |
| 18 | HE ER SU | 20 |
| 19 | HE SU | 40 |
| 20 | HE SU | 80 |
| 21 | HE SU (Two Separate RF LOs) | 160 |
| 22 | HE SU (Single RF LO) | 160 |
| 23 | HE MU | 20 |
| 24 | HE MU | 40 |
| 25 | HE MU | 80 |
| 26 | HE MU (Two Separate RF LOs) | 160 |
| 27 | HE MU (Single RF LO) | 160 |
| 28-30 | Reserved | Reserved |
| 31 | DMG | 2160 |
| 32 | EFTM SU | 20 |
| 33 | EFTM SU | 40 |
| 34 | EFTM SU | 80 |
| 35 | EFTM SU (Two Separate RF LOs) | 160 |
| 36 | EFTM SU (Single RF LO) | 160 |
| 37 | EFTM MU | 20 |
| 38 | EFTM MU | 40 |
| 39 | EFTM MU | 80 |
| 40 | EFTM MU (Two Separate RF LOs) | 160 |
| 41 | EFTM MU (Single RF LO) | 160 |
| 42-63 | Reserved | Reserved |

Field values 17-22 and 32-36 can be Single User (SU) Enhanced Fine Timing Measurement (EFTM) format and bandwidths, and field values 23-27 and 37-41 can be Multi-User (MU) Enhanced Fine Timing Measurement (EFTM) format and bandwidths.

At 610, the responding Station (STA) can send an Acknowledgement frame to the initiating Station (STA) in response to receipt of the initiating Fine Timing Measurement (iFTM) request frame. At 615, the responding Station (STA) can send an initiating Fine Timing Measurement (FTM) frame to the initiating Station (STA) after sending the Acknowledgement frame. The responding Station (STA) can indicate the same format and bandwidth in the initiating Fine Timing Measurement (FTM) frame as that requested by the initiating Station (STA), if the responding Station (STA) supports the indicated format and bandwidth. If the responding Station (STA) does not support the format and bandwidth indicated by the initiating Station (STA), the responding Station (STA) can indicate a format and a bandwidth supported by the responding Station (STA), wherein the indicated bandwidth is not wider that the bandwidth requested by the initiating Station (STA). For example, the responding Station (STA) shall not indicate an Enhanced Fine-Timing Measurement (EFTM) format if the initiating Station (STA) requested a DMG, HE, VHT, HT-Mixed or Non-HT format. Similarly, the responding Station (STA) shall not indicate an HE-format if the initiating Station (STA) requested a DMG, VHT, HT-mixed or Non-HT format. The responding Station (STA) shall also not indicate a HT format if the initiating Station (STA) requested a DMG or Non-HT format. The responding Station (STA) shall also not indicate a DMG formal if the initiating Station (STA) requested an EFTM, HE, VHT, HT-mixed or Non-HT format. In addition, the responding Station (STA) shall not indicate a HE MU format if the initiating Station (STA) indicated and HE SU, HE ER SU, VHT or HT-Mixed on Non-HT format. The responding Station (STA) shall also not indicate and HE SU, HE ER SU, VHT or HT-mixed or non-HT format if the initiating Station (STA) indicated and HE MU format.

At 620, the initiating Station (STA) can send an Acknowledgment frame to the responding Station (STA) in response to receipt of the initial Fine Timing Measurement (FTM) frame. At 625, the initiating Station (STA) can also send a first uplink Null Data Packet Announcement (NDPA) frame to the responding Station (STA) in response to receipt of the initial Fine Timing Measurement (FTM) frame. At 630, the initiating Station (STA) can also send a first uplink Null Data Packet (NDP) frame to the responding Station (STA) after sending the first uplink Null Data Packet Announcement (NDPA) frame. The initiating Station (STA) can send the uplink Null Data Packet Announcement (NDPA) frame and the uplink Null Data Packet (NDP) frame using the format and bandwidth indicated by the responding Station (STA) in the initiating Fine Timing Measurement (iFTM) frame.

At 635, the responding Station (STA) can send a first downlink Null Data Packet (NDP) frame to the initiating Station (STA) in response to receipt of the first uplink Null Data Packet (NDP) frame. At 640, the responding Station (STA) can also send a first Location Measurement Report (LMR) to the Initiating Station after sending the first downlink Null Data Packet (NDP) frame. The responding Station (STA) can send the downlink Null Data Packet (NDP) frame and the Location Measurement Report (LMR) using the format and bandwidth indicated by the responding Station (STA) in the initiating Fine Timing Measurement (iFTM) frame. The Location Measurement Report (LMR) can include a responding station timing measurement based on the time-of-arrival (t2_1) of the uplink Null Data Packet (NDP) frame and the time-of-departure (t3_1) of the downlink Null Data Packet (NDP) frame.

The processes a 625-640 can be repeated in one or more additional sounding phases to generate one or more additional sets of uplink Null Data Packet Announcement (NDPA) frames and uplink Null Data Packet (NDP) frames sent from the initiating Station (STA) to the responding Station (STA), and downlink Null Data Packet (NDP)

frames and Location Measurement Reports (LMRs) sent from the responding Station (STA) to the initiating Station (STA).

The distance between the initiating Station (STA) and the responding Station (STA) can be determined based the time-of-departure and time-of arrival of one or more sets of uplink and downlink Null Data Packet (NDP) frames. In one example, the Round Trip Time (RTT) of the uplink and downlink Null Data Packet (NDP) frames can be calculated based Equation 1:

$$RTT = \frac{1}{x}\left(\left(\sum_{k=1}^{x} t4\_x - \sum_{k=1}^{x} t1\_x\right) - \left(\sum_{k=1}^{x} t3\_x - \sum_{k=1}^{x} t2\_x\right)\right)$$

The distance between the initiating Station (STA) and the responding Station (STA) can then be determined based upon the Round Trip Time (RTT). For example, it is known that it takes 3.33 nanoseconds (ns) for the radio frequency signal of the uplink and downlink Null Data Packet (NDP) frames to travel 1 meter. The location of the initiating Station (STA) can also be determined further based on the shared location of the responding Station (STA) (e.g., latitude and longitude of the Access Point responding Station (STA), shared height of the responding Station (STA) (e.g., floor number and/or height above the floor), shared neighbor report, Uniform Resource Identifier (URI) or Domain Name in combination with a network mapping, and/or the like.

Location services derived from the distance measurement can advantageously be used for advertising and marketing, stopping consumer from getting lost, tracking equipment and the like. For example, hyperlocal marketing can be used by businesses to send targeted ads or special offers to consumers' smart phones as they move through stores and shopping centers. In other examples, location services can support application to assist in finding a conference room in a building, an appointment room in a hospital, a gate or concession stand in an airport, or the like. Location services can advantageously leverage ubiquitous WLAN infrastructure deployments, such as Wi-Fi networks, to deliver position data without the need to deploy separate or proprietary infrastructure such as Wi-Fi network beacons. WLAN networks, such as Wi-Fi networks, advantageously work well indoors, where Global Position Satellite (GPS) signals and cellular telephone signals can be weak. Accordingly, the network-based location services in accordance with aspects of the present technology can advantageously provide location service within structures, wherein GPS and cellular network-based location services may not work well.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method of determining a distance between wireless devices comprising:
   determining a format and bandwidth supported by an initiating Station (STA) and a responding Station (STA), including,
      sending by the initiating Station (STA) a timing measurement request to the responding Station (STA), wherein the timing measurement request includes a request of a frame format and bandwidth supported by the initiating Station (STA); and
      receiving by the initiating Station (STA) a timing measurement confirmation from the responding Station (STA), wherein the timing measurement confirmation includes a frame format and bandwidth supported by the Requesting Station having a bandwidth that is no more than the requested frame format and bandwidth supported by the initiating Station (STA);
   exchanging one or more sets of Null Data Packet (NDP) frames between the initiating Station (STA) and the responding Station (STA) using the determined format and bandwidth supported by the initiating Station (STA) and a responding Station (STA), including,
      sending by the initiating Station (STA) one or more uplink Null Data Packet (NDP) frames to the responding Station (STA) using the frame format and bandwidth supported by the Requesting Station; and
      receiving by the initiating Station (STA) one or more downlink Null Data Packet (NDP) frames from the responding Station (STA) having the frame format and bandwidth supported by the Requesting Station; and
   determining a distance of the initiating Station (STA) from the responding Station (STA) based on timing measurements of the on more sets of Null Data Packet (NDP) frames, including,
      receiving by the initiating Station (STA) one or more Location Measurement Reports (LMR) including one or more timing measurements of the uplink and downlink Null Data Packet (NDP) frames from the responding Station (STA), wherein the one or more Location Measurement Reports (LMR) use the frame format and bandwidth supported by the Requesting Station;
      determining by the initiating Station (STA) one or more timing measurements of the uplink and downlink Null Data Packet (NDP) frames; and
      determining by the initiating Station (STA) the distance of the initiating Station (STA) from the responding Station (STA) based on the one or more timing measurements of the uplink and downlink Null Data Packet (NDP) frames received in the one or more Location Measurement Reports (LMR) and determined by the initiating Station (STA).

2. The method according to claim 1, wherein:
   the timing measurement request includes a Wi-Fi initiating Fine Timing Measurement (FTM) request frame;
   the timing measurement confirmation includes a Wi-Fi Fine Timing Measurement (FTM) frame;
   the one or more uplink Null Data Packet (NDP) frames include one or more Wi-Fi Null Data Packet (NDP) frames;
   the one or more downlink Null Data Packet (NDP) frames include one or more Wi-Fi Null Data Packet (NDP) frames; and
   the one or more Location Measurement Reports (LMR) include one or more one or more Location Measurement Report (LMR) frames.

3. The method according to claim 2, wherein determining the format and bandwidth supported by the initiating station and the responding station further includes:
- receiving by the initiating Station (STA) a downlink Wi-Fi Acknowledgment (Ack) frame from the responding Station (STA) in response to the Wi-Fi initiating Fine Timing Measurement (FTM) request frame; and
- sending by the initiating Station (STA) an uplink Wi-Fi Acknowledgment (Ack) frame to the responding Station (STA) in response to the Wi-Fi initiating Fine Timing Measurement (FTM) frame.

4. The method according to claim 2, wherein exchanging the one or more set of Null Data Packet (NDP) frames further includes:
- sending by the initiating Station (STA) one or more Wi-Fi Null Data Packet Announcement (NDPA) frames to the responding Station (STA) prior to sending the one or more Wi-Fi Null Data Packet (NDP) frames.

5. The method according to claim 1, wherein one or more uplink Null Data Packet (NDP) frames, the one or more downlink Null Data Packet (NDP) frames and the one or more Location Measurement Reports (LMR) are iterative sent and received by the initiating Station (STA).

6. The method according to claim 1, wherein:
- the timing measurements of the uplink and downlink Null Data Packet (NDP) frames received in the one or more Location Measurement Reports (LMR) from the responding Station (STA) include time-of-arrival of the one or more uplink Null Data Packet (NDP) frames and time-of-departure of the one or more downlink Null Data Packet (NDP) frames; and
- the timing measurements of the uplink and downlink Null Data Packet (NDP) frames determined by the initiating Station (STA) include time-of departure of the one or more uplink Null Data Packet (NDP) frames and time-of-arrival of the one or more downlink Null Data Packet (NDP) frames.

7. A method of determining a distance between wireless devices comprising:
- receiving by a responding Station (STA) a timing measurement request from an initiating Station (STA), wherein the timing measurement request includes a request of frame format and bandwidth supported by the initiating Station (STA);
- sending by the responding Station (STA) a timing measurement confirmation to the initiating Station (STA), wherein the timing measurement confirmation includes a frame format and bandwidth supported by the Requesting Station having a bandwidth that is no more than the requested frame format and bandwidth supported by the initiating Station (STA);
- receiving by the responding Station (STA) one or more uplink Null Data Packet (NDP) frames from the initiating Station (STA) using the frame format and bandwidth supported by the Requesting Station;
- sending by the responding Station (STA) one or more downlink Null Data Packet (NDP) frames to the initiating Station (STA) having the frame format and bandwidth supported by the Requesting Station;
- determining by the responding Station (STA) one or more timing measurements of the uplink and downlink Null Data Packet (NDP) frames; and
- sending by the responding Station (STA) one or more Location Measurement Reports (LMR) including the one or more timing measurements of the uplink and downlink Null Data Packet (NDP) frames to the initiating Station (STA), wherein the Location Measurement Reports (LMR) uses the frame format and bandwidth supported by the Requesting Station.

8. The method according to claim 7, wherein:
- the timing measurement request includes a Wi-Fi initiating Fine Timing Measurement (FTM) request frame;
- the timing measurement continuation includes a Wi-Fi Fine Timing Measurement (FTM) frame;
- the one or more uplink Null Data Packet (NDP) frames include one or more Wi-Fi Null Data Packet (NDP) frames;
- the one or more downlink Null Data Packet (NDP) frames include one or more Wi-Fi Null Data Packet (NDP) frames; and
- the one or more Location Measurement Reports (LMR) include one or more one or more Location Measurement Report (LMR) frames.

9. The method according to claim 7, wherein one or more uplink Null Data Packet (NDP) frames, the one or more downlink Null Data Packet (NDP) frames and the one or more Location Measurement Reports (LMR) are iterative received and sent by the responding Station (STA).

10. The method according to claim 7, wherein the timing measurements of the uplink and downlink Null Data Packet (NDP) frames determined by the responding Station (STA) include time-of-arrival of the one or more uplink Null Data Packet (NDP) frames and time-of-departure of the one or more downlink Null Data Packet (NDP) frames.

11. A method of determining a distance between wireless devices comprising:
- sending by an initiating Station (STA) a timing measurement request to a responding Station (STA), wherein the timing measurement request includes a request of frame format and bandwidth supported by the initiating Station (STA);
- receiving by the initiating Station (STA) a timing measurement confirmation from the responding Station (STA), wherein the timing measurement confirmation includes a frame format and bandwidth supported by the Requesting Station having a bandwidth that is no more than the requested frame format and bandwidth supported by the initiating Station (STA);
- receiving by the initiating Station (STA) a timing measurement trigger from the responding Station (STA) using the frame format and bandwidth supported by the Requesting Station;
- sending by the initiating Station (STA) one or more uplink Null Data Packet (NDP) frames to the responding Station (STA) using the frame format and bandwidth supported by the Requesting Station;
- receiving by the initiating Station (STA) one or more downlink Null Data Packet (NDP) frames from the responding Station (STA) having the frame format and bandwidth supported by the Requesting Station;
- receiving by the initiating Station (STA) one or more Location Measurement Reports (LMR) including one or more timing measurements of the uplink and downlink Null Data Packet (NDP) frames from the responding Station (STA), wherein the one or more Location Measurement Reports (LMR) use the frame format and bandwidth supported by the Requesting Station;
- determining by the initiating Station (STA) one or more timing measurements of the uplink and downlink Null Data Packet (NDP) frames; and
- determining by the initiating Station (STA) a distance between the initiating Station (STA) and the responding Station (STA) based on the one or more timing measurements of the uplink and downlink Null Data Packet (NDP) frames received in the one or more Location Measurement Reports (LMR) and determined by the initiating Station (STA).

12. The method according to claim 11, wherein:
the timing measurement request includes a Wi-Fi initiating Fine Timing Measurement (FTM) request frame;
the timing measurement confirmation includes a Wi-Fi Fine Timing Measurement (FTM) frame;
the one or more uplink Null Data Packet (NDP) frames include one or more Wi-Fi Null Data Packet (NDP) frames;
the one or more downlink Null Data Packet (NDP) frames include one or more Wi-Fi Null Data Packet (NDP) frames; and
the one or more Location Measurement Reports (LMR) include one or more one or more Location Measurement Report (LMR) frames.

13. The method according to claim 12, further comprising:
receiving by the initiating Station (STA) one or more downlink Wi-Fi Null Data Packet Announcement (NDPA) frames from the responding Station (STA) prior to receiving the one or more downlink Null Data Packet (NDP) frames from the responding Station (STA), wherein the one or more downlink Null Data Packet Announcement (NDPA) frames use the frame format and bandwidth supported by the Requesting Station.

14. The method according to claim 11, wherein one or more uplink Null Data Packet (NDP) frames, the one or more downlink Null Data Packet (NDP) frames and the one or more Location Measurement Reports (LMR) are iterative sent and received by the initiating Station (STA).

15. The method according to claim 11, wherein:
the timing measurements of the uplink and downlink Null Data Packet (NDP) frames received in the one or more Location Measurement Reports (LMR) from the responding Station (STA) include time-of-arrival of the one or more uplink Null Data Packet (NDP) frames and time-of-departure of the one or more downlink Null Data Packet (NDP) frames; and
the timing measurements of the uplink and downlink Null Data Packet (NDP) frames determined by the initiating Station (STA) include time-of departure of the one or more uplink Null Data Packet (NDP) frames and time-of-arrival of the one or more downlink Null Data Packet (NDP) frames.

16. A method of determining a distance between wireless devices comprising:
receiving by a responding Station (STA) a timing measurement request from an initiating Station (STA), wherein the timing measurement request includes a request of frame format and bandwidth supported by the initiating Station (STA);
sending by the responding Station (STA) a timing measurement confirmation to the initiating Station (STA), wherein the timing measurement confirmation includes a frame format and bandwidth supported by the Requesting Station having a bandwidth that is no more than the requested frame format and bandwidth supported by the initiating Station (STA);
sending by the responding Station (STA) a set of timing measurement triggers to a set of initiating Stations (STA) using the frame format and bandwidth supported by the Requesting Station;
receiving by the responding Station (STA) one or more of a set of uplink Null Data Packet (NDP) frames from the set of initiating Stations (STA) using the frame format and bandwidth supported by the Requesting Station;
sending by the responding Station (STA) one or more downlink Null Data Packet (NDP) frames to the set of initiating Stations (STA) having the frame format and bandwidth supported by the Requesting Station;
determining by the responding Station (STA) one or more timing measurements of the uplink and downlink Null Data Packet (NDP) frames; and
sending by the responding Station (STA) one or more Location Measurement Reports (LMR) including the one or more timing measurements of the uplink and downlink Null Data Packet (NDP) frames to the set of initiating Stations (STA), wherein the Location Measurement Reports (LMR) uses the frame format and bandwidth supported by the Requesting Station.

17. The method according to claim 16, further comprising:
sending by the responding Station (STA) a second set of timing measurement triggers to a second set of initiating Stations (STA) using the frame format and bandwidth supported by the Requesting Station;
receiving by the responding Station (STA) one or more of a second set of uplink Null Data Packet (NDP) frames from the second set of initiating Stations (STA) using the frame format and bandwidth supported by the Requesting Station;
further sending by the responding Station (STA) the one or more downlink Null Data Packet (NDP) frames to the second set of initiating Stations (STA) having the frame format and bandwidth supported by the Requesting Station; and
further sending by the responding Station (STA) the one or more Location Measurement Reports (LMR) including the one or more timing measurements of the uplink and downlink Null Data Packet (NDP) frames to the second set of initiating Station (STA), wherein the Location Measurement Reports (LMR) uses the frame format and bandwidth supported by the Requesting Station.

18. The method according to claim 16, wherein:
the timing measurement request includes a Wi-Fi initiating Fine Timing Measurement (FTM) request frame;
the timing measurement confirmation includes a Wi-Fi Fine Timing Measurement (FTM) frame;
the one or more uplink Null Data Packet (NDP) frames include one or more Wi-Fi Null Data Packet (NDP) frames;
the one or more downlink Null Data Packet (NDP) frames include one or more Wi-Fi Null Data Packet (NDP) frames; and
the one or more Location Measurement Reports (LMR) include one or more one or more Location Measurement Report (LMR) frames.

19. The method according to claim 16, wherein one or more uplink Null Data Packet (NDP) frames, the one or more downlink Null Data Packet (NDP) frames and the one or more Location Measurement Reports (LMR) are iterative received and sent by the responding Station (STA).

* * * * *